United States Patent
Nishihara et al.

(10) Patent No.: US 7,488,776 B2
(45) Date of Patent: Feb. 10, 2009

(54) THERMOPLASTIC CROSSLINKED RUBBER COMPOSITION

(75) Inventors: Hajime Nishihara, Yokohama (JP); Yoshikazu Suda, Tokyo (JP); Ikuji Ohtani, Yokohama (JP); Sigeru Sasaki, Yokohama (JP)

(73) Assignee: Asahi Kasei Kabushiki Kaisha, Osaka (JP)

(*) Notice: Subject to any disclaimer, the term of this patent is extended or adjusted under 35 U.S.C. 154(b) by 0 days.

(21) Appl. No.: 10/390,708

(22) Filed: Mar. 19, 2003

(65) Prior Publication Data

US 2003/0181594 A1 Sep. 25, 2003

Related U.S. Application Data

(60) Division of application No. 09/929,489, filed on Aug. 15, 2001, now Pat. No. 6,555,624, and a continuation-in-part of application No. PCT/JP00/09248, filed on Dec. 26, 2000.

(30) Foreign Application Priority Data

Dec. 27, 1999 (JP) .................................. 11-370424

(51) Int. Cl.
*C08F 8/00* (2006.01)
*C08L 9/00* (2006.01)
*C08L 23/00* (2006.01)
*C08L 25/02* (2006.01)

(52) U.S. Cl. .................. 525/191; 525/232; 525/240; 525/241

(58) Field of Classification Search ................. 525/191, 525/232, 240, 241, 217, 221, 238, 242
See application file for complete search history.

(56) References Cited

U.S. PATENT DOCUMENTS

| | | | | |
|---|---|---|---|---|
| 4,197,377 A | * | 4/1980 | Bohm et al. | 525/99 |
| 4,250,273 A | * | 2/1981 | Bohm et al. | 525/99 |
| 4,889,888 A | * | 12/1989 | Bassi et al. | 525/75 |
| 5,216,074 A | * | 6/1993 | Imai et al. | 525/66 |
| 5,977,259 A | * | 11/1999 | Sugimoto et al. | 525/232 |
| 6,335,095 B1 | * | 1/2002 | Sugimoto et al. | 428/402 |

FOREIGN PATENT DOCUMENTS

| | | |
|---|---|---|
| EP | 0026293 A1 | 4/1981 |
| EP | 0296438 A2 | 12/1988 |
| EP | 0651009 A1 | 5/1995 |
| JP | 32240 | 1/1991 |
| JP | 8120127 | 5/1996 |
| JP | 8188700 | 7/1996 |
| JP | 9137001 | 5/1997 |
| JP | 9302156 | 11/1997 |
| JP | 11140298 | 5/1999 |
| JP | 20007904 | 1/2000 |
| WO | WO-99/29775 A1 | 6/1999 |

* cited by examiner

*Primary Examiner*—Thao T. Tran
(74) *Attorney, Agent, or Firm*—Birch, Stewart, Kolasch & Birch, LLP

(57) ABSTRACT

A thermoplastic crosslinked rubber composition comprising (A) from 1 to 99 parts by weight of a hydrogenated rubber obtained by hydrogenating not less than 50% of total double bonds of at least one homopolymer rubber of a conjugated diene type monomer or a random copolymer rubber consisting of a conjugated diene type monomer unit and an aromatic vinyl monomer unit and (B) from 1 to 99 parts by weight of an olefinic thermoplastic resin, total amount of (A) and (B) being 100 parts by weight, said (A) being partially or completely crosslinked, wherein said (A) is crystalline rubber, having a crystallization temperature in a range of from −50 to 70° C. and a heat quantity of crystallization at peak in a range of from 3 to 100 J/g in differential scanning calorimetry (DSC method).

5 Claims, No Drawings

THERMOPLASTIC CROSSLINKED RUBBER COMPOSITION

CROSS-REFERENCE TO RELATED APPLICATIONS

This application is a divisional of application Ser. No. 09/929,489, filed on Aug. 15, 2001 now U.S. Pat. No. 6,555,624, the entire contents of which are hereby incorporated by reference and for which priority is claimed under 35 U.S.C. § 120; and this application claims priority of application Ser. No. 11-370424 filed in Japan on Dec. 27, 1999 under 35 U.S.C. §119.

This application is a continuation-in-part of an international application PCT/JP00/09248 filed on Dec. 26, 2000 and having US as one of the designated countries, the content of which is herein incorporated by reference.

BACKGROUND OF THE INVENTION (1) Field of the Invention

The present invention relates to a thermoplastic crosslinked rubber composition. More particularly, the present invention relates to a thermoplastic crosslinked rubber composition with superior appearance, feeling, heat and light stabilities, scratch resistance, oil resistance and mechanical strength (2) Description of the Related Art A thermoplastic elastomer composition obtained by, so to speak, dynamic crosslinking, that is crosslinking during melt mixing of a radically crosslinkable elastomer and a radically non-crosslinkable resin such as polypropylene (PP) in an extruder in the presence of a radical initiator, is well known technology and widely used in applications such as automotive parts.

As one of such rubbery compositions, a composition prepared by applying the dynamic crosslinking technology to an olefinic elastomer is known (JP-A-8-120127 and JP-A-9-137001). However, it has not necessarily been satisfied in the market due to its inferior scratch resistance.

One the other hand, as examples of dynamic crosslinking technology using a rubber other than olefinic elastomers, the followings are known: A dynamically crosslinked elastomer composition comprising an olefinic elastomer together with a hydrogenated diene rubber, compounded further with a crystalline α-olefinic polymer, an ethylenic polymer and a softening agent (JP-A-9-302156), and a thermoplastic elastomer composition obtained by melt mixing of a polyolefinic resin and a random or a block copolymer of a conjugated diene type monomer and an aromatic vinyl monomer in the presence of a crosslinking agent (JP-A-3-2240). None of these compositions has enough mechanical strength, scratch resistance, appearance and heat and light stabilities. Thus there remains a need of a thermoplastic rubber composition acceptable for the practical use.

SUMMARY OF THE INVENTION

Based on these problems, an object of the present invention is to provide a thermoplastic crosslinked rubber composition, which does not have the above described problems, that is, superior in appearance, feeling, heat and light stabilities, scratch resistance, oil resistance and mechanical strength.

A thermoplastic crosslinked rubber composition of the present invention is mainly composed of partially or completely crosslinked rubber and a thermoplastic resin as a flow component. The inventors conducted thorough study to improve the thermoplastic rubber composition, and suprisingly found out the followings. In the case of a thermoplastic resin as a flow component being an olefinic resin as a rubber component, use of a hydrogenated rubber of a homopolymer rubber of conjugated diene type monomer or a random copolymer of a conjugated diene type monomer unit and an aromatic vinyl monomer unit as a rubber component, having a specified crystallinity, dramatically improves appearance, feeling, heat and light stabilities, scratch resistance, oil resistance and mechanical strength.

The present invention thus provides a thermoplastic crosslinked rubber composition comprising (A) from 1 to 99 parts by weight of a hydrogenated rubber obtained by hydrogenating not less than 50% of total double bonds of at least one homopolymer rubber of a conjugated diene type monomer or a random copolymer rubber consisting of a conjugated diene type monomer unit and an aromatic vinyl monomer unit and (B) from 1 to 99 parts by weight of an olefinic thermoplastic resin, total amount of (A) and (B) being 100 parts by weight, said (A) being partially or completely crosslinked, wherein said (A) is crystalline rubber, having a crystallization temperature in a range of from −50 to 70° C. and a heat quantity of crystallization at peak in a range of from 3 to 100 J/g in differential scanning calorimetry (DSC method).

The present invention preferably provides a thermoplastic crosslinked rubber composition obtained by crosslinking (A) from 1 to 99 parts by weight of a hydrogenated rubber obtained by hydrogenating not less than 50% of total double bonds of at least one homopolymer rubber of a conjugated diene type monomer or a random copolymer rubber consisting of a conjugated diene type monomer unit and an aromatic vinyl monomer unit and (B) from 1 to 99 parts by weight of an olefinic thermoplastic resin, total amount of (A) and (B) being 100 parts by weight, wherein said (A) is crystalline rubber, having a crystallization temperature in a range of from −50 to 70° C. and a heat quantity of crystallization at peak in a range of from 3 to 100 J/g in differential scanning calorimetry (DSC method).

Further, in the case of a thermoplastic resin as a flow component being a non-olefinic thermoplastic resin, preferably styrene-based resin (an olefinic thermoplastic resin may present together), a hydrogenated rubber of a homopolymer rubber of a conjugated diene type monomer or a random copolymer of a conjugated diene type monomer unit and an aromatic vinyl monomer unit as a rubber component, having a specified crystallinity, even if it is a non-crystalline rubber, shows superior appearance, feeling, heat and light stabilities, scratch resistance, oil resistance and mechanical strength. In the case of a thermoplastic resin as a flow component being a non-olefinic thermoplastic resin (an olefinic thermoplastic resin may present together), even non-hydrogenated rubber as a rubber component also shows superior appearance, feeling, scratch resistance, oil resistance and mechanical strength, although inferior in heat and light stabilities. It was found out that, in the case using this non-hydrogenated rubber, a rubber composition can be used in applications where heat and light stabilities are not required, due to satisfying practical characteristics, although it lacks heat and light stabilities. It was also found out that, in the case of a thermoplastic resin as a flow component being a non-olefinic thermoplastic resin (an olefinic thermoplastic resin may present together), even a block copolymer of a conjugated diene type monomer unit and an aromatic vinyl monomer unit as a rubber component shows superior appearance, feeling, heat and light stabilities, scratch resistance, oil resistance and mechanical strength.

The present invention thus provides a thermoplastic crosslinked rubber composition comprising (A) from 1 to 99 parts by weight of at least one homopolymer rubber of a conjugated diene type monomer or a random or block copolymer rubber consisting of a conjugated diene type monomer unit and an aromatic vinyl monomer unit or a hydrogenated rubber thereof (preferably not has than 50% of the total double bonds thereof being hydrogenated) and (B) from 1 to 99 parts by weight of a non-olefinic thermoplastic resin (preferably a styrene-based resin) or a mixture of an olefinic thermoplastic resin and a non-olefinic thermoplastic resin (preferably styrene-based resin), total amount of (A) and (B) being 100 parts by weight, said (A) being partially or completely crosslinked wherein said (A) is a non-crystalline rubber or a crystalline rubber (preferably a crystalline rubber having a crystallization temperature in a range of from −50 to 70° C. and a heat quantity of cyrstallization at peak in a range of from 3 to 100 J/g in differential scanning calorimetry (DSC method)).

The present invention preferably provides a thermoplastic crosslinked rubber composition obtained by crosslinking (A) from 1 to 99 parts by weight of at least one homopolymer rubber of a conjugated diene type monomer or a random or block copolymer rubber consisting of a conjugated diene type monomer unit and an aromatic vinyl monomer unit or a hydrogenated rubber thereof (preferably not has than 50% of the total double bonds thereof being hydrogenated) and (B) from 1 to 99 parts by weight of a non-olefinic thermoplastic resin (preferably a styrene-based resin) or a mixture of an olefinic thermoplastic resin and a non-olefinic thermoplastic resin (preferably styrene-based resin), total amount of (A) and (B) being 100 parts by weight, wherein said (A) is a non-crystalline rubber or a crystalline rubber (preferably a crystalline rubber having a crystallization temperature in a range of from −50 to 70° C. and a heat quantity of cyrstallization at peak in a range of from 3 to 100 J/g in differential scanning calorimetry (DSC method)).

In the case of a thermoplastic resin as a (B) component being a mixture of an olefinic thermoplastic resin and a non-olefinic thermoplastic resin, the mixture containing not less than 40% by weight (including 100% by weight) of the non-olefinic thermoplastic resin becomes a thermoplastic crosslinked rubber composition having characteristics of a non-olefinic thermoplastic resin. For example, in the case of a non-olefinic thermoplastic resin being a styrene-based resin, molded parts obtained from the composition are elastomer materials superior, for example, in printability, coating performance and adhesion to a styrene-based resin, which are not possessed by a olefinic elastomer, although they are not sufficient in rubber elasticity such as permanent compression set. On the other hand, in the case of the content of a non-olefinic thermoplastic resin in the mixture being not less than 1% by weight and less than 40% by weight, the composition becomes a material superior in rubber elasticity such as permanent compression set and improved in printability and coating performance, although not sufficient in adhesion to a styrene-based resin.

The thermoplastic crosslinked rubber composition of the present invention is superior in appearance, feeling, heat and light stabilities, scratch resistance, oil resistance and mechanical strength, and can be used in wide applications including automotive parts such as automotive interior parts and air bag covers, machine parts, electrical parts, cables, hoses, belts, toys, miscellaneous goods, daily necessaries, construction materials, sheets and films, and thus has a big industrial role.

DESCRIPTION OF THE PREFERRED EMBODIMENTS

The present invention will be explained in detail hereinbelow.

The present invention, in the case of a flow component being an olefinic thermoplastic resin, provides a thermoplastic crosslinked rubber composition comprising (A) hydrogenated rubber with specific crystallinity and (B) an olefinic thermoplastic resin, said (A) being partially or completely crosslinked. The present invention preferably provides a thermoplastic crosslinked rubber composition obtained by crosslinking (A) hydrogenated rubber with specific crystallinity and (B) an olefinic thermoplastic resin.

It is important here that not less than 50% of total double bonds are hydrogenated. Degree of hydrogenation of less than 50% results in reduced heat and light stabilities.

It is preferable that sequential structure of an ethylene unit formed by hydrogenation of a conjugated diene type monomer unit, an aromatic vinyl monomer unit and other component unit is random, because when (A) is composed of an aromatic vinyl block unit and a hydrogenated conjugated diene block unit, crosslinkig reaction is suppressed by the former block unit resulting in inferior mechanical strength of an elastomer composition obtained. Presence of too many continuous ethylene sequences in hydrogenated conjugated diene abruptly accelerates progress of crosslinkig reaction, which generates coagulation of crosslinked rubber and decreases appearance and mechanical strength of a thermoplastic crosslinked composition obtained.

Crystallization temperature of (A) in differential scanning calorimetry (DSC method) is in the range of from −50 to 70° C., preferably in the range from −30 to 50° C. and more preferably in the range of from −20 to 50° C. Heat quantity of crystallization at peak of (A) is in the range of from 3 to 100 J/g, preferably in the range of from 3 to 50 J/g, and more preferably in the range of from 5 to 40 J/g. It was found that hydrogenated rubber having a crystallization temperature and a heat quantity of crystallization at peak within the above range showed superior feeling and improved appearance, scratch resistance, oil resistance and mechanical strength.

In further embodiment, the present invention provides a thermoplastic crosslinked rubber composition, in the case of a flow component being an non-olefinic thermoplastic resin, preferably a styrene-based resin, comprising (A) a non-crystalline and/or crystalline rubber or a hydrogenated rubber thereof, preferably crystalline hydrogenated rubber and (B) a non-olefinic thermoplastic resin or a mixture of an olefinic thermoplastic resin and a non-olefinic thermoplastic resin, said (A) being partially or completely crosslinked.

The present invention preferably provides a thermoplastic crosslinked rubber composition obtained by crosslinking (A) a non-crystalline and/or crystalline rubber or a hydrogenated rubber thereof, preferably crystalline hydrogenated rubber and (B) a non-olefinic thermoplastic resin or a mixture of an olefinic thermoplastic resin and a non-olefinic thermoplastic resin.

It was found that, in the case of a thermoplastic resin as a (B) component being a non-olefinic thermoplastic resin (an olefinic thermoplastic resin may present together), unlike the case of the (B) component being an olefinic thermoplastic resin, a non-crystalline rubber, a non-hydrogenated rubber and a copolymer of a conjugated diene type monomer unit and an aromatic vinyl monomer unit showed superior practical characteristics although the copolymer is a block copolymer rubber. Thus the present invention has been completed.

It will be described hereinbelow why even a non-crystalline rubber, non-hydrogenated rubber or block copolymer rubber of a conjugated diene type monomer unit and an aromatic vinyl monomer unit shows superior characteristics, in the case of a thermoplastic resin as a (B) component being a non-olefinic thermoplastic resin (an olefinic thermoplastic resin may present together).

It is the feature of a thermoplastic crosslinked composition of the present invention to provide molded parts thereof showing superior appearance (appearance of extruded sheets), feeling, heat and light stabilities, scratch resistance, oil resistance and mechanical strength. In the case of a thermoplastic resin as a (B) component being an olefinic thermoplastic resin, rubber as an (A) component consisting of non-crystalline rubber, non-hydrogenated rubber and block copolymer rubber of a conjugated diene type monomer unit and an aromatic vinyl monomer unit does not satisfy these performances. However, in the case of a thermoplastic resin as a (B) component being a non-olefinic thermoplastic resin (an olefinic thermoplastic resin may present together), for example, a non-olefinic thermoplastic resin being a styrene-based resin, it provides superior appearance, feeling, scratch resistance, oil resistance and mechanical strength, among the above characteristics, and thus practical performance is satisfied (although heat and light stabilities are not necessarily satisfactory, it is usable in applications where weather resistance is not required).

Further, it will be described hereinbellow why the above superior characteristics are shown, in the case of a thermoplastic resin as a (B) component being a non-olefinic thermoplastic resin (an olefinic thermoplastic resin may present together), for example, in the case of a non-olefinic thermoplastic resin being a styrene-based resin. The explanation is generally true in the case of an olefinic thermoplastic resin being other than polypropylene (PP) and also true in the case of a non-olefinic thermoplastic resin being a thermoplastic resin other than a styrene-based resin.

(1) Appearance and Mechanical Strength

The composition of the present invention is generally prepared by dynamic crosslinking of rubber as an (A) component and a thermoplastic resin as a (B) component in the presence of a crosslinking agent. In the case of a (B) component being an olefinic thermoplastic resin, polypropylene (PP) is mainly used. However, PP is a decomposing type resin and thus a crosslinking agent is consumed not only for crosslinking of rubber but also for decomposition of PP. In contrast, in the case of a (B) component being polystyrene (PS), a crosslinking agent is not consumed for decomposition of PS and effectively utilized in crosslinking of rubber, because PS is a non-decomposing type resin. Thus, PP system (a crosslinked rubber composition with polypropylene as a (B) component will hereinafter be referred to as PP system) requires more amount of an initiator than PS system (a crosslinked rubber composition with polystyrene as a (B) component will hereinafter be referred to as PS system) to attain a degree of crosslinking of rubber in a high equivalent level. The addition of higher amount of an initiator in PP system tends to generate local crosslinking reaction and it thus causes coagulation of crosslinked rubber. This provides inferior appearance to the sheets obtained by such composition of the present invention. No progress of uniform crosslinking and presence of coagulated crosslinked rubber lower mechanical strength. In PS system, on the other hand, coagulation of crosslinked rubber rarely occurs due to crosslinking by appropriate amount of an initiator, and thus superior sheet appearance and mechanical strength are obtained. In the case using non-crystalline rubber, non-hydrogenated rubber and block copolymer rubber in PP system, practical characteristics such as sheet appearance and mechanical strength are not satisfactory. However, in PS system, these practical characteristics are satisfactory because of intrinsic good sheet appearance and mechanical strength.

(2) Oil Resistance and Feeling

In automotive interior applications, one application area of a crosslinked composition of the present invention, such as instrumental panel and door trim, it is required not to swell in machine oil. Evaluation criteria of oil resistance is not to swell in liquid paraffin oil. PP system tends to swell and has low oil resistance because PP and liquid paraffin oil are the same olefinic materials. PS system, on the other hand, shows good-oil resistance compared with PP system because PS has different structure from liquid paraffin oil. Oil is generally added to a crosslinked composition of the present invention to adjust hardness and flexibility. Oil bleed in PS system is less than PP system and thus the former provides better feeling. In the case using non-crystalline rubber, non-hydrogenated rubber and block copolymer rubber in PP system, practical characteristics such as oil resistance and feeling are not satisfactory. However, in PS system, these practical characteristics are satisfactory because of intrinsic good oil resistance and feeling.

(3) Scratch Resistance

PP is a semi-soft resin and PS is a rigid resin. PS system is thus superior in scratch resistance to PP system. In the case of using non-crystalline rubber, non-hydrogenated rubber and block copolymer rubber in PP system, practical characteristics of scratch resistance is not satisfactory. However, in PS system, this practical characteristics is satisfactory because of intrinsic good scratch resistance.

In the case of a thermoplastic resin as a (B) component being a non-olefinic thermoplastic resin (an olefinic thermoplastic resin may present together), use of crystalline rubber shows superior characteristics and it is preferable that in using crystalline rubber, crystallization temperature of (A) in the differential scanning calorimetry (DSC method) is preferably in the range of from −50 to 70° C., more preferably in the range of from −30 to 50° C., and most preferably in the range of from −20 to 50° C. Heat quantity of crystallization at peak of (A) is preferably in the range of from 3 to 100 J/g, more preferably in the range of from 3 to 50 J/g, and most preferably in the range of from 5 to 40 J/g.

Each component of the present invention will be explained hereinbelow in detail. In the present invention, in the case of a (B) component being an olefinic thermoplastic resin, (A) is a hydrogenated rubber of at least one homopolymer of a conjugated diene or a random copolymer rubber consisting of a conjugated diene type monomer unit and an aromatic vinyl monomer unit, whereas, in the case of (B) component being a non-olefinic thermoplastic resin or a mixture of an olefinic thermoplastic resin and a non-olefinic thermoplastic resin, (A) is at least one homopolymer of a conjugated diene or a random or block copolymer rubber consisting of a conjugated diene type monomer unit and an aromatic vinyl monomer unit or a hydrogenated rubber thereof, and optionally, a monomer unit copolymerizable with conjugated diene, such units as olefinic, methacrylate, acrylate, unsaturated nitrile and vinyl chloride may be included.

The above conjugated diene type monomer includes 1,3-butadiene, isoprene, 2,3-dimethyl-1,3-butadiene, 1,3-pentadiene, 2-methyl-1,3-pentadiene, 1,3-hexadiene, 4,5-diethyl-1,3-octatadiene, 3-butyl-1,3-octatadiene and chloroprene. 1,3-Butadiene, isoprene and 1,3-pentadiene are preferable and 1,3-butadiene and isoprene are most preferable.

The above aromatic vinyl monomer includes styrene, α-methylstyrene, p-methylstyrene, t-butylstyrene, divinylbenzene, N,N-dimethyl-p-aminoethylstyrene and vinylpyridine. Styrene and α-methylstyrene are preferable. The above aromatic vinyl monomer can be used as one type alone or in combination of two or more types.

The amount of aromatic vinyl monomer in (A) is preferably from 0 to 80% by weight, more preferably from 0 to 50% by weight and most preferably from 0 to 30% by weight.

In using a random copolymer in the present invention, vinyl bonds of a conjugated diene unit may be present uniformly in the molecule or in increasing or decreasing way along the molecular chain and multiple number of blocks having different vinyl bond content may be included. In the case of an aromatic vinyl monomer unit or the above described monomer unit copolymerizable with a conjugated diene type monomer being included, these monomer units are bonded randomly in the above conjugated diene type monomer parts, however block type bonds of an aromatic vinyl monomer unit or the other monomer unit may be included. Content of the block type aromatic vinyl monomer unit in total aromatic vinyl monomer unit is preferably not higher than 20% by weight and more preferably not higher than 10% by weight. In a block copolymer, preferable block structure of the block copolymer includes a linear block copolymer such as SB, $S(BS)_n$ (n is an integer from 1 to 3) and $S(BSB)_n$ (n is 1 or 2); and a star shaped block copolymer with B part as bonding center and expressed by $(SB)_nX$ (n is an integer from 3 to 6, X is a residual group of a coupling agent such as $SiCl_4$, $SnCl_4$ and a polyepoxy compound), wherein S and B designates a polymerized block of an aromatic vinyl unit and a polymerized block of a conjugated diene unit including a hydrogenated unit thereof, respectively. A linear block copolymer of a SB two block type, a SBS triblock type or a SBSB tetra block type is preferable among others.

In the case of the above described (A) component, that is homopolymer rubber of a conjugated diene type monomer or random or block copolymer rubber of a conjugated diene type monomer unit and an aromatic vinyl monomer unit, being hydrogenated, molded parts by a thermoplastic crosslinked rubber composition of the present invention shows superior stability to heat and light compared with non-hydrogenated counterparts. In the case of hydrogenation, degree of hydrogenation of the above described hydrogenated rubber is not less than 50% based on original total double bonds, preferably not less than 90%, more preferably not less than 95%, and amounts of residual double bonds in main and side chains are preferably 5% or less. A typical example of such rubber includes a partially or completely hydrogenated rubbery polymer of diene type rubber such as polybutadiene, polyisoprene, polychloroprene and diene type random or block copolymer rubber such as poly(styrene-butadiene). Hydrogenated butadiene type, hydrogenated poly(styrene-butadiene) type and hydrogenated isoprene type rubber are particularly preferred.

Hydrogenation of double bonds in the present invention is applicable only to a conjugated diene type monomer unit and not to an aromatic vinyl monomer unit.

Such hydrogenated rubber is obtained by partial hydrogenation of the above described rubber by known hydrogenation methods. These hydrogenation methods include, for example, use of triisobutylboran catalysts described in F. L. Ramp. et al., J. Amer. Chem. Soc., 83, 4672 (1961), use of toluenesulfonylhydrazide described in Hung Yu Chen, J. Polym. Sci. Polym. Letter Ed., 15, 271 (1977), organocobalt-organoaluminium or organonickel-organoaluminium based catalysts in JP-B-42-8704 and the like. Particularly preferred hydrogenation methods are those disclosed in JP-A-59-133203 and JP-A-60-220147, where hydrogenation catalysts which effectively work in mild conditions of low temperature and low pressure are used, or a method disclosed in JP-A-62-207303, where a polymer is contacted with hydrogen in an inactive organic solvent in the presence of catalysts consisting of a bis(cyclopentadienyl)titanium compound and a hydrocarbon compound having a Na, K, Rb or Cs atom.

In the case of (A) being crystalline rubber, crystalline temperature and heat quantity of crystallization at peak, which are indices of crystallinity, are controlled by the addition of a polar compound such as tetrahydrofuran or by adjustment of polymerization temperature. Lowering of heat quantity of crystallization at peak can be attained by increase in the amount of a polar compound or increase in 1,2-vinyl bonds by lowering of polymerization temperature.

Preferably, (A) has Mooney viscosity (ML) at 100° C. in the range of 20-150 and viscosity of a 5% by weight styrene solution at 25° C. (5% SV) in the range of 20-300 centipoise (cps). Particularly preferred 5% SV is 25-150 cps.

In the case of a thermoplastic resin as a (B) component in the present invention being an olefinic thermoplastic resin, it is preferable to use multiple number of hydrogenated rubber. In particular, a composition consisting of (A-1) hydrogenated rubber having an aromatic vinyl monomer unit of not higher than 5% by weight and (A-2) hydrogenated rubber having an aromatic vinyl monomer unit of not less than 5% by weight and not higher than 90% by weight, and that difference of the amounts of the aromatic vinyl monomer units in (A-1) and (A-2) is not less than 5% by weight shows enhanced improvement effects of appearance, heat and light stabilities, scratch resistance, oil resistance and mechanical strength. Content of (A-2) in hydrogenated rubber consisting of (A-1) and (A-2) is preferably from 1 to 99% by weight, more preferably from 10 to 99% by weight, and most preferably from 20 to 80% by weight.

In the case of (B) being a non-olefinic thermoplastic resin or a mixture of an olefinic thermoplastic resin and a non-olefinic thermoplastic resin, as described above, crystalline and non-crystalline rubber, and hydrogenated and non-hydrogenated rubber can be used as homopolymer rubber of a conjugated diene type monomer or random copolymer rubber consisting of a conjugated diene type monomer unit and an aromatic vinyl monomer unit, that is an (A) component. A random copolymer or a block copolymer can be used as copolymer rubber consisting of a conjugated diene type monomer unit and an aromatic vinyl monomer unit, that is an (A) component. There is no limitation of combination in single use, and such combination may be used as crystalline/hydrogenated/random copolymer, crystalline/non-hydrogenated/random copolymer and crystalline/hydrogenated/block copolymer. Also there is no limitation of combination in combined use, and such combination may be crystalline/hydrogenated/random copolymer and non-crystalline/hydrogenated/random copolymer; crystalline/hydrogenated/random copolymer and crystalline/non-hydrogenated/random copolymer; and crystalline/hydrogenated/random copolymer and crystalline/hydrogenated/block copolymer.

In the present invention, (B) is composed of an olefinic thermoplastic resin and/or a non-olefinic thermoplastic resin and it is preferable that an olefinic thermoplastic resin is a propylene type resin. This olefinic thermoplastic resin has similar structure to (A) and thus disperses homogeneously.

There is no limitation in a non-olefinic thermoplastic resin as long as it disperses homogeneously with (A) in the absence or presence of a compatibilizer. For example, polystyrene, polyphenylene ether, polyvinylchloride, polyamide, polyester, polyphenylenesulfide, polycarbonate and polymethacrylate types can be used as single or in mixture of two types or more of them. In particular, a styrene-based resin is preferable as a non-olefinic thermoplastic resin.

Typical propylene type resin, one of the most suitably used olefinic resin in the present invention includes isotacic polypropylene homopolymer and isotactic copolymer resin (including block and random types) of propylene and other α-olefin such as ethylene, butene-1, pentene-1 and hexene-1.

In the present invention, (B) is preferably a single component of (B-1) a propylene type random copolymer resin such as a random copolymer resin of ethylene and propylene, or combination of (B-1) and (B-2) a propylene type block copolymer or homopolymer resin. Such combination of two types of olefinic resins as (B-1), a crosslinked type olefinic resin, and (B-2), a decomposition type olefinic resin, further improves appearance and mechanical strength. (B-1) includes, for example, a random copolymer resin of ethylene and propylene, and in the case of ethylene components being present in a polymer main chain, they are starting sites of crosslinkig and thus providing characteristics of a crosslinked type olefinic resin.

(B-2) has propylene as a major component and preferably does not have ethylene units in a polymer main chain. If ethylene/α-olefin copolymer is present as dispersed phase in a propylene resin as in a propylene block resin, it provides characteristics of a decomposition type olefinic resin.

(B) may be a combination of mulutiple (B-1) and (B-2) components.

Most preferable one among (B-1), a random copolymer resin with α-olefin, having propylene as a major component, can be manufactured by such methods as high pressure, slurry, vapor phase, mass or solution methods and Ziegler-Natta, single site or metallocene catalysts are preferably used. A random copolymerimerization method using a metallocene catalyst is particularly preferable when sharp distributions of composition and molecular weight are required.

A typical method for manufacturing a random copolymer resin is disclosed in European patent No. 0969043A1 or U.S. Pat. No. 5,198,401, where, liquid propylene is introduced into a reactor equipped with a stirrer, followed by the addition of a catalyst into a vapor or liquid phase through a nozzle. Then ethylene gas or α-olefin is introduced into a vapor or liquid phase of the reactor and reaction temperature and reaction pressure are controlled so that propylene is in refluxing condition. Polymerization rate is controlled by catalyst concentration and reaction temperature, whereas copolymer composition by the addition amount of ethylene or α-olefin.

Furthermore, preferable melt index of an olefinic thermoplastic resin used in the present invention is in the range from 0.1 to 100 g/10 min. (230° C., 2.16 kg-loaded). A resin with melt index over 100 g/10 min. shows insufficient heat resistance and mechanical strength, whereas a resin with melt index lower than 0.1 g/10 min. is not desirable due to lower fluidity and poor processability.

In the present invention, styrene-based resin, one of a preferable non-olefinic thermoplastic resin among (B), is a rubber non-modified styrene-based resin and/or a rubber modified styrene-based resin.

The above described rubber non-modified styrene-based resin is a homopolymer of an aromatic vinyl monomer described in (A) or a copolymer of two or more types of monomers, along with, optionally, a copolymer with unsaturated nitrile monomer such as acrylonitrile and methacrylonitrile; acrylate or methacrylate with a alkyl group having carbon number of from 1 to 8; or acrylic acid, methacrylic acid, maleic acid anhydride and N-substituted maleinimide monomers. A homopolymer of an aromatic vinyl monomer, that is polystyrene is most preferable among others due to availability at low cost. In the case of a copolymer, a copolymer with a monomer consisting of acrylate or methacrylate is superior in light stability (weatherability) and preferable.

A rubber modified styrene-based resin is a resin with rubbery polymer particles dispersed in a matrix of a rubber non-modified styrene-based resin, which is obtained by polymerization of an aromatic vinyl monomer and optional vinyl monomers copolymerizable with this, in the presence of rubbery polymer, by well known mass, emulsion or suspension polymerization methods.

Examples of such a rubber modified styrene-based resin include high impact polystyrene (HIPS), ABS resin (acrylonitrile-butadiene-styrene copolymer), AAS resin (acryronitrile-acrylic rubber-styrene copolymer) and AES resin (acryronitrile-ethylene/propylene rubber-styrene copolymer).

Preferable combination as (B) includes, polyethylene alone, polypropylene alone polystyrene alone, combination of polypropylene and polyethylene and combination of polypropylene and polystyrene.

In the case using an olefinic thermoplastic resin as a (B) component, a compatibilizer is not particularly needed because it has affinity, that is compatibility with an (A) component. However, in the case using a non-olefinic thermoplastic resin or a combination of a non-olefinic thermoplastic resin and an olefinic thermoplastic resin as a (B) component, a compatibilizer is added optionally. For example, in the case of a non-olefinic thermoplastic resin being a styrene-based resin, if an (A) component is copolymer rubber of a conjugated diene type monomer unit and an aromatic vinyl monomer unit or hydrogenated rubber thereof, this rubber and styrene-based resin are compatible and thus the addition of a compatibilizer is generally not necessary. However, if an (A) component is homopolymer rubber of a conjugated diene type monomer or hydrogenated rubber thereof, these rubber and a styrene-based resin are incompatible and cause phase separation and thus reduce mechanical strength. In this case, therefore, it is preferable to add a compatibilizer. The addition of a compatibilizer enhances mechanical strength of parts molded with a thermoplastic crosslinked rubber composition of the present invention (even in the case of an (A) component being copolymer rubber of a conjugated diene type monomer unit and an aromatic vinyl monomer unit or hydrogenated rubber thereof, the addition of a compatibilizer tends to enhance mechanical strength, and thus a compatibilizer may be added also in this case).

A compatibilizer includes, for example, a polymer having both polystyrene and polyolefin components in a molecule. Such an example includes a A-B type block copolymer, wherein, A is polystyrene or a copolymer with styrene, preferably polystyrene and B is polyethylene, polypropylene, an ethylene/α-olefin copolymer with α-olefin having carbon atoms from 3 to 20 as a major component, hydrogenated polybutadiene and hydrogenated polyisoprene; a B copolymer grafted with A; and an A copolymer grafted with B. Such a copolymer is also included as a B polymer component randomly introduced with A monomer, in particular such an ethylene-styrene random polymer as described bellow, that is a copolymer, wherein an A monomer component, that is styrene monomer, is randomly introduced in a B polymer component consisting of polyethylene. B may be single or a combination of two or more. Typical examples of these include polypropylene grafted with styrene, a block or random copolymer of styrene with butadiene or isoprene, a hydrogenated block or random copolymer of styrene with butadiene or isoprene, and an ethylene-styrene random copolymer.

In the case of (B) being a non-olefinic or non-styrene-based thermoplastic resin, presence of a compatibilizer together is generally preferable. A method for selection of this compatibilizer is the same as in the case of a (B) component being a styrene-based resin. That is, this compatibilizer includes a A-B type block copolymer, wherein, A is a thermoplastic resin component used as a (B) component or a thermoplastic resin component having affinity with this and B is polyethylene, polypropylene, an ethylene/$\alpha$-olefin copolymer with $\alpha$-olefin having carbon atoms from 3 to 20 as a major component, hydrogenated polybutadiene and hydrogenated polyisoprene; a (B) copolymer grafted with (A); and an (A) copolymer grafted with B. Such a copolymer is also included as a B polymer component randomly introduced with an (A) monomer.

In the present invention, (B) is from 1 to 99 parts by weight in total 100 parts by weight of (A) and (B), preferably from 10 to 90 parts by weight, more preferably from 20 to 80 parts by weight, and most preferably from 30 to 70 parts by weight. (B) less than 1 part by weight tends to lower fluidity and processability of a composition, whereas, over 99 parts by weight tends to lower flexibility of a composition.

The present invention is a thermoplastic crosslinked rubber composition comprising (A) at least one homopolymer rubber of a conjugated diene type monomer or a copolymer rubber consisting of a conjugated diene type monomer unit and an aromatic vinyl monomer unit or a hydrogenated rubber thereof and (B) a thermoplastic resin. The (A) in this composition must be crosslinked but may be partially or completely crosslinked. The degree of crosslinking of (A) is 1% or more, preferably 30% or more, and it can be 100%. Rubber elasticity, heat resistance, mechanical strength and the like are improved by crosslinking.

(B) is a flow component in the composition of the present invention and basically should not be crosslinked. However, (B) can be slightly or partially crosslinked to such an extent so as not to impair flowability.

Rubber in a thermoplastic composition of the present invention is preferably crosslinked by using (C) a crosslinking agent. (C) includes (C-1) a crosslinking initiator as an essential component and optionally (C-2) a multifunctional monomer and (C-3) a monofunctional monomer.

The amount of (C) described above is from 0.01 to 10 parts by weight, preferably from 0.05 to 3 parts by weight based on total 100 parts by weight of (A) and (B). The amount less than 0.01 parts by weight gives insufficient crosslinking and the amount over 10 parts by weight tends to lower appearance and mechanical strength of a composition.

A crosslinking initiator (C-1) described above includes a radical initiator such as an organoperoxide, an organoazo compound and the like. A typical example of (C-1) includes peroxyketals such as 1,1-bis(t-butyl peroxy)-3,3,5-trimethylcyclohexane, 1,1-bis(t-hexyl peroxy)-3,3,5-trimethylcyclohexane, 1,1-bis(t-hexyl peroxy)cyclohexane, 1,1-bis(t-butyl peroxy)cyclododecane, 1,1-bis (t-butyl peroxy)-cyclohexane, 2,2-bis(t-butyl peroxy)octane, n-buthyl-4,4-bis(t-butyl peroxy)butane and n-buthyl-4,4-bis(t-butyl peroxy)valetate; dialkyl peroxides such as di-t-butyl peroxide, dicumil peroxide, t-butylcumil peroxide, $\alpha,\alpha'$-bis(t-butyl peroxy-m-isopropyl)benzene, $\alpha,\alpha'$-bis(t-butyl peroxy)diisopropylbenzene, 2,5-dimethyl-2,5-bis(t-butyl peroxy) hexane and 2,5-dimethyl-2,5-bis(t-butyl peroxy)hexine-3; diacyl peroxides such as acethyl peroxide, isobutyryl peroxide, octanoyl peroxide, decanoyl peroxide, lauroyl peroxide, 3,5,5-trimethylhexanoyl peroxide, benzoyl peroxide, 2,4-dichlorobenzoyl peroxide and m-toluoyl peroxide; peroxy esters such as t-buthyl peroxy acetate, t-buthyl peroxy isobuthylate, t-buthyl peroxy-2-ethyl hexanoate, t-buthyl peroxy laurylate, t-buthyl peroxy benzoate, di-t-buthyl peroxy isophthalate, 2,5-dimethyl-2,5-di(benzoyl peroxy)hexane, t-buthyl peroxy maleic acid, t-buthyl peroxy isopropylcarbonate and cumil peroxy octate; and hydroperoxides such as t-buthyl hydroperoxide, cumene hydroperoxide, diisopropylbenzene hydroperoxide, 2,5-dimethylhexane-2,5-dihydroperoxide and 1,1,3,3-tetramethylbuthyl hydroperoxide.

Among these compounds, 1,1-bis(t-butyl peroxy)-3,3,5-trimethylcyrohexane, di-t-butyl peroxide, dicumil peroxide, 2,5-dimethyl-2,5-bis(t-butyl peroxide)hexane and 2,5-dimethyl-2,5-bis(t-butyl peroxide)hexene-3 are preferable.

The amount of the above described (C-1) in a component (C) is preferably from 1 to 80% by weight, more preferably from 10 to 50% by weight. The amount less than 1% by weight results in insufficient crosslinking and the amount over 80% by weight lowers mechanical strength.

A multifunctional monomer (C-2), one of a crosslinking agent (C) of the present invention preferably has a radically polymerizable functional group, in particular, vinyl group. Number of a functional group is not less than two, and (C-2) with three or more functional groups in combined use with (C-3) is particularly effective. A typical example suitably used includes divinylbenzene, triallyl isocianulate, triallyl cianulate, diacetonediacrylamide, poly(ethylene glycol)diacrylate, poly(ethylene glycol) dimethacrylate, trimethylolpropane trimethacrylate, trimethylolpropane triacrylate, (ethylene glycol)dimethacrylate, (triethylene glycol) dimethacrylate, (diethylene glycol) dimethacrylate, diisopropenylbenzen, p-quinonedioxime, p,p'-dibenzoylquinonedioxime, phenylmaleimide, allyl methacrylate, N,N'-m-phenylenebismaleimide, diallyl phthalate, tetraallyl oxyethane and 1,2-polybutadiene. Triallylisocianulate is particularly preferred. These multifunctional monomers may be used in combination with other ones.

(C-2) described above is preferably used in the amount from 1 to 80% by weight in a (C) component, more preferably from 10 to 50% by weight. The amount less than 1% by weight results in insufficient crosslinking and the amount over 80% by weight lowers mechanical strength.

The above described (C-3) used in the present invention is a vinyl type monomer to be added to control crosslinking reaction rate and is preferably a radically polymerizable vinyl type monomer including such monomer as aromatic vinyl, unsaturated nitrile such as acrylonitrile and methacrylonitrile, acrylate, methacrylate, acrylic acid, methacrylic acid, maleic anhydride and N-substituted maleimide.

(C-3) described above is preferably used at the amount of from 1 to 80% by weight in a (C) component, more preferably from 10 to 50% by weight. The amount less than 1% by weight results in insufficient crosslinking and the amount over 80% by weight lowers mechanical strength.

It is preferable to add (D) a softening agent to a thermoplastic crosslinked rubber composition of the present invention. The addition of (D) makes possible lower hardness and flexibility. (D) is preferably process oil such as paraffinic and naphthenic types. These are used at the amount from 5 to 500 weight parts, preferably from 10 to 150 parts by weight based on total 100 parts by weight of (A) and (B). The amount less than 5 parts by weight results in insufficient flexibility and processability and the amount over 500 parts by weight is not desirable due to significant oil bleed out.

In the present invention, (A) is a main component and a rubbery polymer other than (A) may be compounded optionally, whose amount is preferably from 1 to 100 parts by weight based on total 100 parts by weight of (A) and (B), more preferably from 1 to 50 parts by weight and most preferably from 5 to 50 parts by weight.

A compounding method for the above rubbery polymer includes simultaneous mixture with (A) and (B), followed by crosslinking or compounding of the rubbery polymer other than (A) after crosslinking reaction of (A) and (B).

An example of such rubbery polymer includes an ethylene/α-olefin copolymer containing ethylene and α-olefin having carbon atoms of from 3 to 20, wherein α-olefin having carbon atoms from 3 to 20 includes propylene, buten-1, penten-1 and octen-1. Such an ethylene/α-olefin copolymer is preferably manufactured by using well known metallocene catalysts.

In the present invention, in the case of a thermoplastic resin as a (B) component being a polyolefinic resin, a rubbery polymer other than (A) optionally compounded is preferably polystyrene-based thermoplastic elastomer such as a block copolymer consisting of an aromatic vinyl unit and a conjugated diene unit and a block copolymer with a partially hydrogenated or epoxydized unit of the above conjugated diene unit.

An aromatic vinyl monomer constituting the above described block copolymer includes styrene, α-methylstyrene, p-methylstyrene, p-chlorostyrene, p-bromostyrene and 2,4,5-tribromostyrene, and styrene is most preferable. Styrene may be copolymerized with above described other minor aromatic vinyl monomers.

A conjugated diene unit constituting the above block copolymer includes 1,3-butadiene, isoprene and the like A preferable block structure of a block copolymer includes a linear block copolymer such as SB, $S(BS)_n$ (n is an integer from 1 to 3) and $S(BSB)_n$ (n is 1 or 2); a star shaped block copolymer with B part as bonding center and expressed by $(SB)_nX$ (n is an integer from 3 to 6, X being a residual group of a coupling agent such as $SiCl_4$, $SnCl_4$ and a polyepoxy compound), wherein S and B designates a polymerized block of an aromatic vinyl unit and a polymerized block of a conjugated diene unit including a hydrogenated unit thereof, respectively. A linear block copolymer of a SB two blocks type, a SBS triblocks type and a SBSB tetra blocks type is preferable among others.

In the present invention, when abrasion resistance is required, polyorganosiloxane, having kinematic viscosity of not less than 5000 centistokes (cs) at 25° C. as specified by JIS-K2410, can be added optionally.

There is no limitation in the above polyorganosiloxane types as long as it is in the state of from viscous malt syrup to gum and is a polymer containing siloxane unit substituted with an alkyl, vinyl and/or aryl group. Polydimethylsiloxane, among others, is most preferable.

Kinematic viscosity (25° C.) of polyorganosiloxane used in the present invention is not less than 5000 cs, more preferably not less than 10,000 cs and less than 100,000 cs and most preferably not less than 50,000 cs and less than 100,000 cs.

The addition amount of polyorganosiloxane used in the present invention is preferably from 0.01 to 20 parts by weight based on total 100 parts by weight of (A) and (B), more preferably from 0.1 to 10 parts by weight, and most preferably from 0.5 to 5 parts by weight.

An inorganic filler or a plasticizer may be added to a composition of the present invention up to the loading level not to impair its features. An inorganic filler to be used in the present invention includes calcium carbonate, magnesium carbonate, silica, carbon black, glass fiber, titanium dioxide, clay, mica, talc, magnesium hydroxide and aluminum hydroxide. A plasticizer to be used includes poly(ethylene glycol), phthalates such as dioctyl phthalate (DOP) and the like. Other additives suitably used include organic and inorganic pigment, heat stabilizer, antioxidant, UV absorber, light stabilizer, flame retardant, silicone oil, anti-blocking agent, foaming agent, antistatic agent and antibacterial agent.

For manufacturing the composition of the present invention, general equipment used to manufacture usual resin and rubber compositions such as Banbury mixer, kneader, single screw extruder and twin screw extruder may be used. A twin screw extruder, in particular, is preferably used to attain effective dynamic crosslinking. A twin screw extruder is more suitable to disperse (A) and (B) uniformly and finely, to induce crosslinking reaction by adding other components and to continuously produce a composition of the present invention.

An example of suitable process for manufacturing of a thermoplastic composition of the present invention is as follows: (A) and (B) are charged into an extruder hopper after blending well. (C) may be added either at initial stage together with (A) and (B) or from a middle feed section of the extruder. (D) may also be fed either from the second feed section or from the first and the second feed sections dividedly. A part of (A) and (C) may be added from the second feed section of the extruder. Pellets of a composition of the present invention can be obtained by crosslinking (A) with (C) before melt mixing in an extruder followed by melt blending by the addition of (D) a softening agent to perform crosslinking, mixing and dispersing sufficiently before taking out pellets from the extruder.

A particularly preferable melt extrusion process is to use twin screw extruder with L/D from 5 to 100, wherein L is an extruder length from a feed section for raw materials to die, and D is diameter of barrel. Preferable twin screw extruder has multiple feed sections, that is, a main feed section and a side feed section, at different lengths from the extruder tip, and kneading zones between these feed sections and between the tip and the feed section locating closer to the tip, wherein length of each kneading zone is from 3D to 10D.

Twin screw extruder used in the present invention may be a co-rotating type or a counter rotating screw type. Screw type may also be any one of non-intermeshing, partially intermeshing and complete intermeshing types. A counter rotating and partial intermeshing type screw is preferable for the case of uniform mixing of resin under low shear force and at low temperature. For the case of mixing requiring relatively high shear force, a co-rotating and partial intermeshing type screw is desirable. For mixing requiring further higher shear force, a co-rotating and complete intermeshing type screw is desirable.

In the present invention, morphology of a composition consisting of (A) and (B) is also important to attain an improved appearance and mechanical strength and it is preferable that weight average particle size of (A) is from 0.01 to 3 μm and d1/d2 ratio, that is ratio of length dl to breadth d2 of an (A) particle, is from 1 to 3. An (A) component should be present as independent particles and a (B) component as a continuous phase. To attain such morphology, it is important to adopt high shear force and control crosslinking rate. Practically, it is important to decrease amounts of a crosslinking initiator and a crosslinking promoter and carry out the reaction at the lowest possible temperature not lower than decomposition temperature of a crosslinking initiator and for the longest possible time. Combined use of multi- and monofunctional monomers as crosslinking promoters is preferred.

The excessive addition of a initiator or a promoter or use of a initiator or a promoter having excessively high activity or a reaction condition at high temperature generates aggregations of a rubbery polymer and thus does not satisfy requirements of the present invention. Crosslinking reaction can be controlled to proceed mildly by making (A) absorb small amount of (D) a softening agent in advance and compounding an initiator and a promoter into (A), and thus small and uniform particles can be generated.

In the present invention, degree of crosslinking of (A) is preferably from 1 to 95% and degree of swelling from 3 to 100, more preferably degree of swelling is from 3 to 20, and most preferably from 3 to 10 to suppress bleed of an added component, in particular (D) a softening agent. On morphology, it is preferable in order to suppress bleed of an added component, in particular (D) a softening agent that volume of (A) particles with diameter from 0.01 to 3 μm in total particle volume is not higher than 10%, preferably not higher than 5%, and most preferably not higher than 3%.

To attain such morphology, it is important that (A) particles are very large and non-uniform and to attain that, ratio of melt viscosity of (A) to (B) should be large. It can also be attained by increasing crosslinking rate. In particular, (B) with lower molecular weight than (A) is used. It can also be attained by increasing the amount of a crosslinking initiator or a crosslinking promoter and reaction is performed at a temperature as high as possible over decomposition temperature of a crosslinking initiator and for a time as long as possible. It is preferable to use a multifunctional monomer as a crosslinking promoter and trifunctional one is better than bifunctional one. However, the addition of excess amount of a crosslinking initiator and promoter or the addition of an excessively high active crosslinking initiator and promoter or high temperature reaction conditions may generate coagulation of a rubbery polymer and may not satisfy requirements of the present invention.

As a manufacturing process for attaining enhanced mechanical strength, it is desirable and important to satisfy the following requirements for a degree of mixing M:

$$M=(\pi^2/2)(L/D)D^3(N/Q)$$

$$10\times 10^6 \leq M \leq 1000\times 10^6$$

wherein, L is a length of extruder from a feed section to die (mm), D is an inner diameter of extruder barrel (mm), Q is an output rate (kg/h) and N is a screw rotation number (rpm).

M smaller than $10\times 10^6$ impairs appearance due to enlarged and aggregated particles, whereas M over $1000\times 10^6$ lowers mechanical strength due to excessive shear force.

Furthermore, melt temperatures preferably satisfy the following relationships to attain further good mechanical strength: Melt mixing is first performed at melt temperature $T_2$ (° C.), then at melt temperature $T_3$ (° C.). In particular, first melt mixing is done at melt temperature $T_2$ (° C.) in the first extruder zone from 0.1 L to 0.5 L, wherein L is length from an extruder feed section to die, then second melt mixing at $T_3$ (° C.) in the following extruder zone.

In particular, preferable $T_1$ is from 150 to 250° C. and melt temperatures in each extruder zone ($T_2$ and $T_3$) may be uniform or have a gradient.

$T_1$: Temperature at which (C-1) decomposes by half in 1 min.

$$T_1-100<T_2<T_1+40$$

$$T_2+1<T_3<T_2+200$$

A rubber composition thus obtained may be molded to various parts by means of any molding methods. Suitably used molding methods are injection, extrusion, compression, blow, calender, foaming and the like.

EXAMPLES

The present invention is further described in detail by the following Examples and Comparative Examples, but the present invention should not be limited to them. Test methods used in Examples and Comparative Examples to evaluate the physical properties are as follows.

1. Analysis of Conjugated Diene Type Rubber
1) Degree of Hydrogenation (%)
Degree of hydrogenation was determined using NMR by the following procedure.

Firstly, polybutadiene rubber before hydrogenation was dissolved into deuterated chloroform, then integrated intensities of the signals at chemical shift 4.7-5.2 ppm (signal C0 for 1,2-vinyl proton, =CH—) and 5.2-5.8 ppm (signal D0 for vinyl proton, =CH$_2$) were determined using FT-NMR (270M, made by JEOL Ltd.). From these data, the degree of hydrogenation (V) was calculated by the following formula.

$$(V)=[0.5\ C0/\{0.5\ C0+0.5(D0-0.5\ C0)\}]\times 100$$

Then, a partially hydrogenated polybutadiene was dissolved into deuterated chloroform. Integrated intensities of the signals at chemical shift 0.6-1.0 ppm (signal A1 for methyl group proton of hydrogenated 1,2-bond, —CH$_3$), signals at 4.7-5.2 ppm (signal C1 for non-hydrogenated 1,2-vinyl proton, =CH—) and 5.2-5.8 ppm (D1 for non-hydrogenated vinyl proton, =CH—) were determined similarly using FT-NMR.

Assuming the following:

$$p=0.5\ C0/(0.5C1+A1/3)$$

$$A11=pA1, C11=pC1, D11=pD1$$

then, degree of hydrogenation of 1,2-vinyl bonds (B) and degree of hydrogenation of 1,4-double bonds (C) were calculated as follows:

$$(B)=[(A11/3)/\{A11/3+C11/2\}]\times 100$$

$$(C)=[\{0.5(D0-0.5C0)-0.5(D11-0.5C11)\}/0.5(D0-0.5C0)]\times 100$$

Degree of hydrogenation of whole butadiene parts (A) was calculated as follows:

$$(A)=(V)\times(B)/100+[100-(V)]\times(C)\times 100$$

2) Microstructure
Each microstructure content (%) of rubber is given by the following formulas using the notations defined above.

Content of 1,2-vinyl before hydrogenation (%)=(V)×(B)/100

Content of 1,4-bond before hydrogenation (%)={100−(V)}×(C)/100

Content of 1,2-vinyl after hydrogenation (%)=(V)×{100−(B)}/100

Content of 1,4-bond after hydrogenation (%)={100−(V)}×{100−(B)}/100

2. Crystallization Temperature and Heat Quantity of Crystallization at Peak of (A) Crystallization temperature and heat quantity of crystallization at peak of (A) were measured by differential scanning calorimetry (DSC method). In more detail, using thermal analysis equipment system WS002 of MAK SCIENCE JAPAN Co., a 10 mg of sample was heated at 10° C./min from room temperature under nitrogen gas flow, and just after temperature reached to 100° C., it was cooled at 10° C./min to −100° C. Crystallization temperature and heat quantity of crystallization at peak in the present specification were determined from the crystallization peaks detected in this procedure.

Crystallization temperature here is a peak top temperature and heat quantity of crystallization at peak (J/g) was calculated from peak area surrounded by a curve showing heat quantity change against a base line. The above curve includes both broad and sharp ones. The peak top temperature is a point where a line parallel to the base line contacts to the heat quantity change curve as a tangential line.

3. Degrees of Crosslinking and Swelling of (A)

After weighing weight of (A) in a composition ($W_0$) in advance, the composition was refluxed in 200 ml of xylene for 20 hours, then the solution was filtered through a filter and weight of swelled composition ($W_1$) was measured. Then after the above swelled composition was vacuum dried, its weight was measured again ($W_2$) Based on these data, degrees of crosslinking and swelling were calculated as follows:

degree of crosslinking=$(W_2/W_0) \times 100(\%)$ degree of swelling=$W_1/W_2$

4. Diameter and Volume of Rubbery Polymer Particles

Particle diameter and particle volume of rubbery polymer were obtained by the following calculation methods based on individual data of 500 rubbery polymer particles in a transmission electron microscopic photograph using ultra thin slicing method for a composition. That is, particle diameter of each particle was determined from particle area S as $(4S/\pi)^{0.5}$. Weight average particle diameter is used as average particle diameter and particle shape is expressed by d1/d2, that is ratio of length d1 to breadth d2. Particle volume is defined as $S^{1.5}$ and total particle volume is expressed by sum of each particle volume.

Even if particles with diameter from 0.01 to 3 μm are present, they were looked as one particle when they were coagulated and contacted together.

5. Melting Point and Heat Quantity of Melting at Peak of (B)

Melting point and heat quantity of melting at peak of (B) were measured by differential scanning calorimetry (DSC method). In more detail, using thermal analysis equipment system WS002 of MAK SCIENCE JAPAN Co., a 10 mg of sample was heated at 10° C./min from room temperature under nitrogen gas flow, and just after temperature reached to 200° C., it was cooled to 0° C. at 10° C./min, and then heated to 200° C. at 10° C./min. Based on melting peeks detected in this procedure, melting point and heat quantity of melting at peak in the present specification were defined as follows.

Melting point is a peak top temperature and heat quantity of melting at peak (J/g) was calculated from peak area surrounded by a curve showing heat quantity change against a base line. The above curve includes both broad and sharp ones. The peak top temperature is a point where a line parallel to the base line contacts to the heat quantity change curve as a tangential line.

6. Judgment of Crosslinking Type or Decomposition Type of (B)

A composition having weight ratio of polyolefinic resin/POX/DVB=100/0.67/1.33 was melt mixed using "Laboplastmill", Toyo Seiki Seisaku-syo Ltd., at the set temperature of 200° C. and revolving number of 100 rpm for 10 min. A pellet state resin charged into "Laboplastmill" changes its state to semi-molten state and finally to molten state without maintaining any original shape. A polypropylene resin characterized by having a higher torque than $M_0$ which is a torque just after melting in the later melting stage is defined as crosslinking type, whereas, a polypropylene resin characterized by having a torque not higher than M0 in the later melting stage is defined as decomposition type.

7. Light Stability

Sample was irradiated using light stability test instrument, ATLAS CI35W Weatherometer (made by ATLAS Electric Devices Co., U.S.A) in accordance with JIS K7102.

Irradiation conditions: Temperature inside the instrument 55° C., humidity 55%, no rain, Xenon light with wavelength of 340 nm and energy of 0.30 W/m², irradiation time 300 hrs.

Light stability was evaluated by color change based on color difference E in L.a.b. method, of the sample before and after the test, using SM color computer type model SM-3, Suga Test Equipment Co. Smaller color change means higher light stability (weather resistance).

8. Heat Stability (TGA Method)

A sample was held at 200° C. for 1 hour under nitrogen gas flow using Shimadzu TGA equipment DT-40, Simadzu Corp., and weight retention based on initial weight was used as index of heat stability.

9. Appearance

Appearance of extruded sheet surface or surface of injection molded parts was evaluated according to the following criteria.

◎ excellent
○ good
Δ good but relatively rough
X rough as a whole without gloss

10. Tensile Strength at Break (MPa)

Evaluation was performed at 23° C. in accordance with JIS K6251.

11. Scratch Resistance

A wedge (300 g, tip dimension of 10 mm length×1 mm width) was dropped onto a test sheet from 5 cm height. Scratch on the sheet surface was evaluated by laser light scanning and damaged depth was measured.

12. Oil Resistance

After measuring weight of a 2 mm thick composition sheet ($W_0$) in advance, the composition sheet was kept in liquid paraffin oil at 80° C. for 20 hours, then weight of the composition sheet ($W_1$) was measured, based on which weight change ratio was calculated as follows:

weight change ratio=$[(W_1-W_0)/W_0] \times 100(\%)$

13. Bleed Test

Molded parts were held in an atmosphere at 120° C. for 100 hours and the surface was then observed to evaluate bleed.

◎ Excellent
○ good
Δ a little adhesion of oily substance
X much adhesion of oily substance providing sticky feeling 14. Abrasion Resistance Abrasion resistance was given by number of reciprocation until the embossed marks on the surface disappear. Evaluation conditions are as follows.

Equipment: "Gakushin" type abrasion tester
Temperature: 23° C., ambient atmosphere
Stroke: 120 mm
Frequency: 1 reciprocation/2 sec
Load: 200 g
Friction cloth: 100% cotton cloth, shirting No.3, folded in three (in accordance with JIS L0803)
Contact area: 1 cm$^2$ 15. Feeling Sheet surface was evaluated by hand touching in 23° C. atmosphere on non-stickiness and residual finger print on the surface, according to the following criteria.
◎ excellent and smooth feeling without finger print
○ not sticky but with finger print
X sticky with finger print 16. Vacuum Forming Processability A 1 mm thick sheet was contacted at a rectangular mold with a bottom shape of 15 cm square and 5 cm depth, then heated for the sheet surface to become 140° C. by an infrared heater, followed by vacuum forming to prepare a molded part. Thus obtained part was inspected by naked eye on mold reproducibility and pattern transfer by the following criteria:
◎ excellent mold reproducibility and pattern transfer
○ good
Δ good but with a little inferior mold reproducibility and pattern transfer at corner zone
X poor 17. Compression set (%)

Evaluation was performed at 70° C. for 22 hours in accordance with JIS K6301.

18. Adhesion Test

A 0.2 mm thick sheet of a composition of the present invention was prepared by compression molding. The sheet was inserted at a bottom of a mold in an injection molding machine (Toshiba IS45PNV) and high impact polystyrene (HIPS) on the market was injection molded over the sheet. Adhesion state was evaluated using this laminated part.
◎ not peelable (failure of substrate)
○ peelable with strong force
Δ peelable easily, though adhered.
X no adhesion 19. Coating Performance Urethane coating material on the market (solvent type) was brush coated on the sheet surface of a composition of the present invention and dried. Whether the coating film was peeled from the sheet or not during bending was evaluated.
○ not peelable
Δ not peelable, though partly peelable by repeated bending
X peelable Material components used in Examples and Comparative Examples are as follows.

1. Rubber Polymer (A)

1) Conjugated Diene Copolymer and Conjugated Diene/Aromatic Vinyl Random Copolymer These were prepared according to the following procedure.

To a 10 ml autoclave reactor equipped with a stirrer and a jacket, a butadiene/n-hexane solution (butadiene concentration of 20% by weight) was charged at 20 L/hr and n-butyl lithium/n-hexane solution (concentration of 5% by weight) was charged at 70 ml/hr, and continuous polymerization was performed at the polymerization temperature of 110° C. After deactivation of thus obtained active polymer, 8 L of the polymer solution was transferred to another 10 L reactor equipped with a stirrer and a jacket, followed by addition of a hydrogenation catalyst, a 250 ml solution of di-p-tolylbis(1-cyclopentadienyl)titanium/cyclohexane (concentration of 1 ml/l) and a 50 ml solution of n-butyl lithium (concentration of 5 ml/l), mixed in advance at 0° C. under hydrogen pressure of 2 kg/cm$^2$, followed by hydrogenation reaction for 30 minutes under hydrogen partial pressure of 3 kg/cm$^2$. To a hydrogenated polymer solution thus obtained was added 0.5 parts by weight of 2,6-di-tert-butylhydroxytoluene based on 1 part of the polymer, as an antioxidant and solvent was removed. The hydrogenated polymers were obtained by hydrogenation under various hydrogenation conditions (hydrogenation pressure, hydrogenation temperature, time and catalyst level). Results are shown in Tables 1 and 2. Control of heat quantity of crystallization at peak was controlled by the addition of a polar compound tetrahydrofuran (THF) or by adjusting polymerization temperature. Low heat quantity of crystallization at peak was attained by increasing amount of the polar compound or by lowering polymerization temperature. A hydrogenated styrene-butadiene copolymer was obtained by similar polymerization with further addition of styrene.

Non-hydrogenated rubber was obtained by the above method without hydrogenation.

2) Conjugated Diene/Aromatic Vinyl Block Copolymer (referred to as SEBS)

Trade name is TUFTEC, manufactured by Asahi Chem. Co., Ltd.

2. Rubbery Polymer Other Than (A)

1) Ethylene/Octene-1 Copolymer (Referred to as TPE-1)

This copolymer was prepared with a metallocene catalyst disclosed in JPA-3-163088. Composition ratio of ethylene/octene-1 in the copolymer was 72/28 (% by weight).

2) Ethylene/Octene-1 Copolymer (Referred to as TPE-2)

This copolymer was prepared with a conventional Zieglar-Natta catalyst. Composition ratio of ethylene/octene-1 in the copolymer was 72/28 (% by weight).

3) Ethylene/Propylene/Ethylidenenorbornene (ENB) Copolymer (referred to as TPE-3)

This copolymer was prepared with a metallocene catalyst disclosed in JP-A-3-163088. Ratio of ethylene/propylene/ENB in the copolymer was 72/24/4 (% by weight).

3. Thermoplastic Resin (1) Polyolefinic Thermoplastic Resin

1) Polypropylene Homopolymer (Referred to as PP-1):

Isotactic polypropylene homopolymer produced by Japan Polyolefin Co. Ltd.

Flexural modulus: 1760 MPa

Melting point by DSC method: 162° C.

Heat content at melting point: 81 J/g

2) Polypropylene Block Polymer (Referred to as PP-2) produced by Japan Polyolefin Co. Ltd.

Flexural modulus: 1180 MPa

Melting point by DSC method: 163° C.

Heat content at melting point: 67 J/g

3) Polypropylene Random Polymer (Ethylene-propylene Random Copolymer) (Referred to as PP-3) Produced by Japan Polyolefin Co. Ltd.

Flexural modulus: 590 MPa

Melting point by DSC method: 130° C.

Heat content at melting point: 45 J/g (2) Styrene-Based Resin
1) Rubber Non-Modified Polystyrene (Referred to as PS)
Trade name is STYRON, manufactured by Asahi Chem. Co., Ltd.
2) Styrene-Methyl Methacrylate Copolymer (Referred to as MS)
Trial manufacture by Asahi Chem. Co., Ltd. (methyl methacrylate 20% by weight)
3) Styrene-n-butyl Acrylate Copolymer (Referred to as SB)
Trial manufacture by Asahi Chem. Co., Ltd. (n-butylacrylate 5% by weight)

(3) Others
Phenylene ether type resin (referred to as PPE): Polyphenylene ether powder, manufactured by Asahi Chem. Co., Ltd. ($\eta sp/C=0.5$ (chloroform))

4. Paraffinic Oil: Daiana Process Oil, PW-90 (Referred to as MO)
Manufactured by Idemitsu Kosan Co., Ltd.

5. Crosslinking Agent (1) Crosslinking Initiator (C-1):
2,5-Dimethyl-2,5-bis(t-butylperoxy)hexane manufactured by NOF Corp. Trade name is Perhexa 25B (referred to as POX-1).

(2) Crosslinking Initiator (C-1):
2,5-Dimethyl-2,5-bis(t-butylperoxy)hexine-3 manufactured by NOF Corp. Trade name is Perhexin 25B (referred to as POX-2).

(3) Multifunctional Monomer (C-2):
Divinylbenzene manufactured by Wako Pure Chemical Ind. Ltd. (referred to as DVB).

(4) Multifunctional Monomer (C-2):
Triallyisocianulate manufactured by Nippon Kasei Chemical Co. Ltd. (referred to as TAIC).

(5) Multifunctional Monomer (C-2):
N,N'-m-phenylenebismaleimide manufactured by Ouchi-Shinko Chemical Ind. Co., Ltd. (referred to as PM1).

(6) Monofunctional Monomer (C-3):
Methyl methacrylate manufactured by Asahi Chem. Co., Ltd. (referred to as MMA).

6. Polyorganosiloxane
Polyorganosiloxanes with various dynamic viscosity were obtained in accordance with a well known method, for example, method for manufacturing silicone, "Silicone handbook" (Daily Industry Newspaper Co., edited by Kunio Ito, 1990), chapter 17.

Examples 1-30, Comparative Examples 1-12

A compound consisting of (A)/PP-1/POX-1/TAIC/MO=50/50/80/0.3/0.6/30 (weight ratio) shown in Tables 1-3 were manufactured using twin extruder (40 mm φ, L/D=47) equipped with a feeding port at the barrel center under the following conditions. Two thread screw having mixing zone at the front and back of the feeding port was used.
Thus obtained compound was then fed to T-die extruder at 200° C. to get a 2 mm thick sheet for various evaluations. Results are shown in Tables 1-3. Extrusion conditions:
1) Melt extrusion temperature: 220° C. constant
2) Output rate Q=12 kg/h
3) Inner diameter of extruder barrel D=25 mm
4) L/D=47 (L is extruder length in mm)
5) Screw revolving speed N=280 rpm Tables 1-3 show that degree of hydrogenation not less than 50% dramatically enhances heat and light stabilities, and when characteristics on crystallinity, that is requirements of the present invention, were satisfied, appearance, heat and light stabilities, scratch resistance, oil resistance and mechanical strength are enhanced.

Examples 31-42

Similar experiment as in Example 4 was repeated except that type of (A) and (B) thermoplastic resin and compound formulation were changed as described in Table 4. Results are shown in Table 4.
Table 4 shows that use of PS or PS/PP as a thermoplastic resin enhances, in particular, scratch resistance. In the case of PS/PP system, higher content of PS provides good adhesion and coating performances, however, impairs compression set.

Examples 43-52

Similar experiment as in Example 4 was repeated except that POX-1 and TAIC were changed to (C-1)-(C-3) as shown in Table 5 and melt mixing was performed first at melt temperature $T_2$ (° C.) and second one at melt temperature $T_3$ (° C.) as defined bellow. Results are shown in Table 5. In the case using (C-2) and (C-3) in combination, both components were used in the same amount.
Table 5 shows that manufacturing under the following melt conditions improves tensile strength at break, appearance and scratch resistance.

$T_1$(° C.)=temperature for 1 minute half-life of (C-1)

$T_1-100<T_2<T_1+40$ $T_2+1<T_3<T_2+200$

Examples 53-64

Similar experiment as in Example 4 was repeated except that (A) in Table 6 was used and the amount ratio of POX-1 to TAIC was changed to control degrees of crosslinking and swelling. Results are shown in Table 6.

Examples 65-74

Similar experiment as in Example 4 was repeated except that that (A) and (B) in Table 7 were used and rubbery polymers other than (A) were added. Results are shown in Table 7.
Table 7 shows that amount of rubbery polymers other than (A) not higher than (A) provides superior appearance, heat and light stabilities, scratch resistance, oil resistance and mechanical strength.

Examples 75-78

Similar experiment as in Example 4 was repeated except that two kinds of (A) components, that is (A-1) and (A-2) were used. Results are shown in Table 8.
Table 8 shows that simultaneous presence of two kinds of (A) components with different structure in crosslinking reaction dramatically enhances heat and light stabilities, scratch resistance, oil resistance and mechanical strength.

Examples 79-92

Similar experiment as in Example 4 was repeated except that (A) components shown in Tables 9 and 10 were used to control shape of (A) rubber particles. Results are shown in Tables 9 and 10.

Examples 93-100

Same procedure as in Example 4 was repeated except that polydimethylsiloxane shown in Table 11 was used. Results were shown in Table 11.

Table 11 shows that polydimethylsiloxane with dynamic viscosity between 50,000 and 100,000 cS provides superior balance of abrasion resistance and appearance.

Examples 101-113

Similar experiment as in Example 4 was repeated except that types of (A) and (B) thermoplastic resins and compound formulation were changed as described in Table 12 and addition amounts of POX-1 and TAIC were halved, that is (A)/(B)/POX-1/TAIC/MO=60/40/0.15/0.3/30. Results are shown in Table 12. In the case of using PS, amount of a crosslinking agent used was halved compared with the case of PP-1. However, degree of crosslinking of rubber component was nearly the same for equivalent compositions. For example, degrees of crosslinking in Example 102 and 110 were 86% and 82%, respectively, whereas, in the case of PP-1 being used as a (B) component, and for formulation of (A)/(B)/POX-1/TAIC/MO=60/40/0.3/0.6/30, degrees of crosslinking were 87% and 82%, respectively. Use of PS as a (B) component provided good sheet appearance (◯) and tensile strength at break of 10 MPa, proving in the practical level, however, use of PP-1 as a (B) component provided poor appearance (X) and tensile strength at break of not higher than 5 MPa, below the practical level.

Table 12, including other characteristics also, shows that by using a styrene-based resin as a thermoplastic resin, use of even non-crystalline rubber, non-hydrogenated rubber and aromatic vinyl/conjugated diene block copolymer rubber provides oil resistance, tensile strength at break, sheet appearance and scratch resistance superior to the case of using an olefinic resin as a thermoplastic resin, and thus makes possible to provide practically usable materials.

TABLE 1

|  |  | Example | | | | Comp. Example | | Example | | | | Comp. Example | |
|---|---|---|---|---|---|---|---|---|---|---|---|---|---|
|  |  | 1 | 2 | 3 | 4 | 1 | 2 | 5 | 6 | 7 | 8 | 3 | 4 |
| (A) | Degree of Hydrogenation (%) at butadiene part | 50 | 85 | 90 | 95 | 0 | 45 |  | | 95 | | | 45 |
|  | Amount of double bond remaining in main chain (%)* | 44 | 11 | 8 | 4.5 | 85 | 47 |  | | 4.5 | | | 47 |
|  | Amount of double bond remaining in side chain (%)** | 6 | 4 | 2 | 0.5 | 15 | 8 |  | | 0.5 | | | 8 |
|  | B/S ratio by weight # |  |  |  | 100/0 |  |  | 90/10 | 80/20 | 50/50 | 30/70 | 80/20 | |
|  | Monomer sequential structure |  |  |  | — |  |  |  | random | | | block | random |
|  | Crystallization temp. (° C.) |  |  |  |  |  |  | 25 | | | | | |
|  | Heat quantity of crystallization at peak (J/g) |  |  |  |  |  |  | 20 | | | | | |
| (B) | Thermoplastic resin |  |  |  |  |  |  | PP-1 | | | | | |
|  | Oil resistance, Rate of weight change (%) | 60 | 55 | 46 | 43 | 86 | 78 | 50 | 47 | 44 | 37 | 78 | 74 |
|  | Light stability, ΔE | 7 | 6 | 3 | 2 | 39 | 21 | 4 | 4 | 3 | 3 | 11 | 21 |
|  | Heat stability, Weight retention (%) | 91 | 94 | 97 | 98 | 31 | 41 | 97 | 96 | 96 | 97 | 89 | 41 |
|  | Tensile strength at break (MPa) | 12 | 14 | 18 | 18 | 3 | 4 | 15 | 15 | 16 | 19 | 4 | 5 |
|  | Appearance of sheet | ◯ | ◯ | ◯ | ◎ | X | X | ◎ | ◎ | ◎ | ◎ | X | X |
|  | Scratch resistance, Depth of wound (μm) | 38 | 31 | 28 | 25 | 158 | 79 | 21 | 19 | 17 | 10 | 73 | 51 |

*Amount of 1,4-bond
**Amount of 1,2-vinyl bond
B: Butadiene
S: Styrene

TABLE 2

|  |  | Comp. Example | Example | | | | | Comp. Example | | Example | | | | | Comp. Example |
|---|---|---|---|---|---|---|---|---|---|---|---|---|---|---|---|
|  |  | 5 | 9 | 10 | 11 | 12 | 13 | 6 | 7 | 14 | 15 | 16 | 17 | 18 | 19 | 8 |
| (A) | Degree of Hydrogenation (%) at butadiene part |  |  |  |  |  |  |  | 95 | | | | | | | |
|  | Amount of double bond remaining in main chain (%)* |  |  |  |  |  |  |  | 4.5 | | | | | | | |
|  | Amount of double bond remaining in side chain (%)** |  |  |  |  |  |  |  | 0.5 | | | | | | | |
|  | B/S ratio by weight # |  |  |  |  |  |  |  | 100/0 | | | | | | | |
|  | Monomer sequential structure |  |  |  |  |  |  |  | — | | | | | | | |
|  | Crystallization temp. (° C.) | −55 | −50 | −10 | 20 | 50 | 70 | 75 | — | | | | 20 | | | |
|  | Heat quantity of crystallization at peak (J/g) |  |  | 15 |  |  |  |  | 0 | 3 | 10 | 30 | 50 | 70 | 100 | 110 |

TABLE 2-continued

| | Comp. Example 5 | Example 9 | 10 | 11 | 12 | 13 | Comp. Example 6 | 7 | Example 14 | 15 | 16 | 17 | 18 | 19 | Comp. Example 8 |
|---|---|---|---|---|---|---|---|---|---|---|---|---|---|---|---|
| (B) Thermoplastic resin | | | | | | | PP-1 | | | | | | | | |
| Oil resistance, Rate of weight change (%) | 110 | 53 | 50 | 40 | 35 | 36 | 38 | 99 | 53 | 42 | 36 | 30 | 25 | 21 | 27 |
| Light stability, ΔE | 5 | 3 | 3 | 3 | 4 | 2 | 5 | 4 | 3 | 2 | 2 | 3 | 3 | 2 | 5 |
| Heat stability, Weight retention (%) | 95 | 97 | 96 | 97 | 98 | 97 | 94 | 93 | 97 | 98 | 97 | 98 | 96 | 96 | 94 |
| Tensile strength at break (MPa) | 3 | 13 | 14 | 17 | 18 | 19 | 17 | 2 | 13 | 16 | 17 | 18 | 18 | 19 | 16 |
| Appearance of sheet | Δ | ◎ | ◎ | ◎ | ◎ | ◎ | ○ | Δ | ◎ | ◎ | ◎ | ◎ | ○ | ○ | X |
| Scratch resistance, Depth of wound (μm) | 143 | 28 | 26 | 24 | 21 | 18 | 115 | 97 | 28 | 26 | 23 | 20 | 21 | 20 | 123 |

*Amount of 1,4-bond
**Amount of 1,2-vinyl bond
B: Butadiene
S: Styrene

TABLE 3

| | Comp. Example 9 | Example 20 | 21 | 22 | 23 | 24 | Comp. Example 10 | 11 | Example 25 | 26 | 27 | 28 | 29 | 30 | Comp. Example 12 |
|---|---|---|---|---|---|---|---|---|---|---|---|---|---|---|---|
| (A) Degree of Hydrogenation (%) at butadiene part | | | | | | | 95 | | | | | | | | |
| Amount of double bond remaining in main chain (%)* | | | | | | | 4.5 | | | | | | | | |
| Amount of double bond remaining in side chain (%)** | | | | | | | 0.5 | | | | | | | | |
| B/S ratio by weight # | | | | | | | 80/20 | | | | | | | | |
| Monomer sequential structure | | | | | | | random | | | | | | | | |
| Crystallization temp. (° C.) | -55 | -50 | -10 | 20 | 50 | 70 | 75 | | | | | | 20 | | |
| Heat quantity of crystallization at peak (J/g) | | 15 | | | | | | 0 | 3 | 10 | 30 | 50 | 70 | 100 | 110 |
| (B) Thermoplastic resin | | | | | | | PP-1 | | | | | | | | |
| Oil resistance, Rate of weight change (%) | 121 | 55 | 52 | 42 | 36 | 38 | 43 | 101 | 55 | 43 | 37 | 33 | 26 | 23 | 29 |
| Light stability, ΔE | 7 | 4 | 4 | 3 | 3 | 3 | 6 | 5 | 3 | 3 | 4 | 3 | 4 | 3 | 7 |
| Heat stability, Weight retention (%) | 93 | 96 | 97 | 95 | 96 | 96 | 94 | 93 | 96 | 97 | 97 | 97 | 96 | 97 | 93 |
| Tensile strength at break (MPa) | 4 | 12 | 15 | 16 | 18 | 15 | 3 | 12 | 15 | 16 | 17 | 16 | 16 | 18 | 15 |
| Appearance of sheet | Δ | ◎ | ◎ | ◎ | ◎ | ◎ | ○ | Δ | ◎ | ◎ | ◎ | ◎ | ○ | ○ | X |
| Scratch resistance, Depth of wound (μm) | 132 | 27 | 24 | 22 | 19 | 17 | 110 | 95 | 26 | 24 | 22 | 18 | 17 | 18 | 118 |

*Amount of 1,4-bond
**Amount of 1,2-vinyl bond
B: Butadiene
S: Styrene

TABLE 4

| | Example 31 | 32 | 33 | 34 | 35 | 36 | 37 | 38 | 39 | 40 | 41 | 42 |
|---|---|---|---|---|---|---|---|---|---|---|---|---|
| (A) Amount | | | | | 60 | | | | 90 | 80 | 40 | 20 |
| Degree of Hydrogenation (%) at butadiene part | | | | | 98 | | | | | | | |
| Amount of double bond remaining in main chain (%)* | | | | | 1.5 | | | | | | | |
| Amount of double bond remaining in side chain (%)** | | | | | 0.5 | | | | | | | |
| B/S ratio by weight # | | | | | 90/10 | | | | | | | |
| Monomer sequential structure | | | | | random | | | | | | | |
| Crystallization temp. (° C.) | | | | | 10 | | | | | | | |
| Heat quantity of crystallization at peak (J/g) | | | | | 20 | | | | | | | |

TABLE 4-continued

| | | Example | | | | | | | | | | | |
|---|---|---|---|---|---|---|---|---|---|---|---|---|---|
| | | 31 | 32 | 33 | 34 | 35 | 36 | 37 | 38 | 39 | 40 | 41 | 42 |
| (B) Thermoplastic resin | Amount | | | | 40 | | | | | 10 | 20 | 60 | 80 |
| | Type | PP-1 | PP-2 | PP-3 | PP-1/PP-3 50 50 | PP-2/PP-3 50 50 | PS | PP-1/PS 80 20 | PP-1/PS 50 50 | | PP-1 | | |
| Oil resistance, Rate of weight change (%) | | 49 | 50 | 50 | 49 | 49 | 51 | 48 | 49 | 53 | 56 | 35 | 27 |
| Light stability, ΔE | | 3 | 3 | 2 | 2 | 2 | 4 | 3 | 3 | 3 | 3 | 4 | 4 |
| Heat stability, Weight retention (%) | | 98 | 98 | 99 | 99 | 98 | 98 | 98 | 98 | 97 | 96 | 97 | 97 |
| Tensile strength at break (MPa) | | 15 | 16 | 18 | 23 | 26 | 21 | 17 | 19 | 13 | 14 | 17 | 19 |
| Appearance of sheet | | ◎ | ◎ | ◎ | ◎ | ◎ | ◎ | ◎ | ◎ | ○ | ◎ | ◎ | ◎ |
| Scratch resistance, Depth of wound (μm) | | 23 | 24 | 23 | 15 | 13 | 8 | 12 | 9 | 29 | 27 | 17 | 11 |
| Adhesion to styrene-based resin | | X | — | — | — | — | ◎ | X | ○ | — | — | — | — |
| Coating performance | | X | — | — | — | — | ○ | Δ | ○ | — | — | — | — |
| Compression set(%) | | 53 | — | — | — | — | 81 | 56 | 67 | — | — | — | — |

*Amount of 1,4-bond
**Amount of 1,2-vinyl bond
B: Butadiene
S: Styrene

TABLE 5

| | | Example | | | | | | | | | |
|---|---|---|---|---|---|---|---|---|---|---|---|
| | | 43 | 44 | 45 | 46 | 47 | 48 | 49 | 50 | 51 | 52 |
| (C-1) | Type | POX-1 | POX-1 | POX-1 | POX-1 | POX-1 | POX-2 | | | POX-1 | |
| | T1 | 180 | 180 | 180 | 180 | 180 | 194 | | | 180 | |
| | T2 | 150 | 85 | 215 | 150 | 150 | 150 | | | 150 | |
| | T3 | 220 | 220 | 220 | 155 | 345 | 220 | | | 220 | |
| (C-2) | | | | | TAIC | | | DVB | PMI | — | TAIC |
| (C-3) | | | | | — | | | — | — | MMA | MMA |
| Light stability, ΔE | | 2 | 3 | 3 | 2 | 3 | 2 | 4 | 5 | 5 | 4 |
| Heat stability, Weight retention (%) | | 98 | 97 | 97 | 96 | 98 | 98 | 93 | 95 | 96 | 98 |
| Tensile strength at break (MPa) | | 12 | 11 | 10 | 10 | 9 | 12 | 11 | 10 | 9 | 12 |
| Appearance of sheet | | ◎ | ◎ | ○ | ◎ | ○ | ○ | ○ | ○ | ◎ | ◎ |
| Scratch resistance, Depth of wound (μm) | | 24 | 22 | 24 | 20 | 29 | 19 | 29 | 23 | 30 | 27 |

In the case of POX-1; T1 = 180, 80 < T2 < 220, T2 + 1 < T3 < T2 + 200
In the case of POX-2; T1 = 194, 94 < T2 < 234, T2 + 1 < T3 < T2 + 200

TABLE 6

| | Example | | | | | | | | | | | |
|---|---|---|---|---|---|---|---|---|---|---|---|---|
| | 53 | 54 | 55 | 56 | 57 | 58 | 59 | 60 | 61 | 62 | 63 | 64 |
| (A) Degree of Hydrogenation (%) in butadiene part | | | | | | 99 | | | | | | |
| Amount of double bond remaining in main chain (%)* | | | | | | 0.5 | | | | | | |
| Amount of double bond remaining in side chain (%)** | | | | | | 0.5 | | | | | | |
| B/S ratio by weight # | | | | | | 100/0 | | | | | | |
| Monomer sequential structure | | | | | | — | | | | | | |
| Crystallization temp. (° C.) | | | | | | 30 | | | | | | |
| Heat quantity of crystallization at peak (J/g) | | | | | | 25 | | | | | | |
| Degree of crosslinking (%) | | | 30 | | | | | | 60 | | | |
| Degree of swelling | 1 | 3 | 10 | 20 | 100 | 110 | 1 | 3 | 10 | 20 | 100 | 110 |

TABLE 6-continued

| | Example | | | | | | | | | | | |
|---|---|---|---|---|---|---|---|---|---|---|---|---|
| | 53 | 54 | 55 | 56 | 57 | 58 | 59 | 60 | 61 | 62 | 63 | 64 |
| Oil resistance, Rate of weight change (%) | 48 | 49 | 51 | 53 | 55 | 59 | 39 | 39 | 41 | 42 | 46 | 51 |
| Light stability, ΔE | 3 | 2 | 3 | 3 | 2 | 4 | 4 | 3 | 3 | 2 | 3 | 4 |
| Heat stability, Weight retention (%) | 97 | 98 | 98 | 98 | 97 | 96 | 96 | 97 | 98 | 98 | 97 | 96 |
| Tensile strength at break (MPa) | 13 | 16 | 18 | 17 | 16 | 13 | 14 | 17 | 19 | 18 | 17 | 11 |
| Appearance of sheet | ◎ | ◎ | ◎ | ◎ | ◎ | ○ | ○ | ○ | ○ | ○ | ○ | ○ |
| Scratch resistance, Depth of wound (μm) | 29 | 23 | 26 | 27 | 29 | 33 | 31 | 26 | 28 | 28 | 31 | 35 |
| Bleed resistance | Δ | ◎ | ◎ | ○ | ○ | Δ | Δ | ◎ | ◎ | ◎ | ○ | Δ |
| Vacuum forming processability | Δ | ◎ | ◎ | ◎ | ◎ | Δ | Δ | ○ | ○ | ○ | ○ | Δ |

*Amount of 1,4-bond
**Amount of 1,2-vinyl bond
B: Butadiene
S: Styrene

TABLE 7

| | Example | | | | | | | | | |
|---|---|---|---|---|---|---|---|---|---|---|
| | 65 | 66 | 67 | 68 | 69 | 70 | 71 | 72 | 73 | 74 |
| (A) Amount | | | | | | 65 | | | | |
| Degree of Hydrogenation (%) in butadiene part | | | | | | 96 | | | | |
| Amount of double bond remaining in main chain (%)* | | | | | | 3.5 | | | | |
| Amount of double bond remaining in side chain (%)** | | | | | | 0.5 | | | | |
| B/S ratio by weight # | | | | | | 70/30 | | | | |
| Monomer sequential structure | | | | | | random | | | | |
| Crystallization temp. (° C.) | | | | | | 25 | | | | |
| Heat quantity of crystallization at peak (J/g) | | | | | | 5 | | | | |
| (B) Thermoplastic resin | | 35 (PP-1) | | | 35/35 (PP-1) (PS) | 35/35 (PP-1) (PS) | | 35 (PP-1) | | |
| Rubber-like polymer other than (A) | 0 | 10 (TPE-1) | 10 (TPE-2) | 10 (TPE-3) | 0 | 3 (SEBS) | 50 (TPE-1) | 65 (TPE-1) | 70 (TPE-1) | 100 (TPE-1) |
| Oil resistance, Rate of weight change (%) | 45 | 49 | 50 | 53 | 50 | 52 | 50 | 52 | 57 | 58 |
| Light stability, ΔE | 3 | 2 | 2 | 6 | 5 | 5 | 3 | 3 | 6 | 6 |
| Heat stability, Weight retention (%) | 97 | 98 | 96 | 94 | 94 | 95 | 98 | 98 | 94 | 93 |
| Tensile strength at break (MPa) | 13 | 14 | 11 | 14 | 13 | 18 | 15 | 15 | 12 | 10 |
| Appearance of sheet | ◎ | ◎ | ◎ | ◎ | ◎ | ◎ | ◎ | ◎ | ○ | ○ |
| Scratch resistance, Depth of wound (μm) | 23 | 21 | 26 | 23 | 18 | 17 | 22 | 20 | 26 | 26 |

*Amount of 1,4-bond
**Amount of 1,2-vinyl bond
B: Butadiene
S: Styrene

TABLE 8

| | Example | | | |
|---|---|---|---|---|
| | 75 | 76 | 77 | 78 |
| (A-1) Amount | 100 | 0 | 50 | Blend of Example 71/ Example 72 = 50/50 by weight ratio |
| Degree of Hydrogenation (%) in butadiene part | | 97 | | |
| Amount of double bond remaining in main chain (%)* | | 2.5 | | |
| Amount of double bond remaining in side chain (%)** | | 0.5 | | |
| B/S ratio by weight # | | 100/0 | | |
| Monomer sequential structure | | — | | |
| Crystallization temp. (° C.) | | 31 | | |
| Heat quantity of crystallization at peak (J/g) | | 25 | | |

TABLE 8-continued

|  | Example | | | |
|---|---|---|---|---|
|  | 75 | 76 | 77 | 78 |
| (A-2) Amount | 0 | 100 | 50 | |
| Degree of Hydrogenation (%) in butadiene part | | 97 | | |
| Amount of double bond remaining in main chain (%)* | | 2.5 | | |
| Amount of double bond remaining in side chain (%)** | | 0.5 | | |
| B/S ratio by weight # | | 30/20 | | |
| Monomer sequential structure | | random | | |
| Crystallization temp. (° C.) | | 20 | | |
| Heat quantity of crystallization at peak (J/g) | | 18 | | |
| Oil resistance, Rate of weight change (%) | 43 | 49 | 36 | 46 |
| Light stability, ΔE | 3 | 5 | 3 | 4 |
| Heat stability, Weight retention (%) | 98 | 96 | 98 | 97 |
| Tensile strength at break (MPa) | 16 | 14 | 20 | 15 |
| Appearance of sheet | ◎ | ◎ | ◎ | ◎ |
| Scratch resistance, Depth of wound (μm) | 25 | 20 | 15 | 22 |

*Amount of 1,4-bond
**Amount of 1,2-vinyl bond
B: Butadiene
S: Styrene

TABLE 9

|  | Example | | | | | | | | | |
|---|---|---|---|---|---|---|---|---|---|---|
|  | 79 | 80 | 81 | 82 | 83 | 84 | 85 | 86 | 87 | 88 |
| (A) Degree of Hydrogenation (%) in butadiene part | | | | | 98 | | | | | |
| Amount of double bond remaining in main chain (%)* | | | | | 1.5 | | | | | |
| Amount of double bond remaining in side chain (%)** | | | | | 0.5 | | | | | |
| B/S ratio by weight # | | | | | 100/0 | | | | | |
| Monomer sequential structure | | | | | — | | | | | |
| Crystallization temp. (° C.) | | | | | 25 | | | | | |
| Heat quantity of crystallization at peak (J/g) | | | | | 30 | | | | | |
| Weight average particle size (μm) | 0.001 | 0.01 | 1.0 | 3.0 | 3.5 | | 0.8 | 1.0 | 2.0 | |
| Ratio of length d1/breadth d2 | | | 1.1 | | | | | | 3.0 | 3.2 |
| Feeling | ○ | ◎ | ◎ | ◎ | ◎ | ○ | ◎ | ◎ | ◎ | ○ |
| Vacuum forming processability | ○ | ◎ | ◎ | ◎ | Δ | ○ | ◎ | ◎ | ◎ | ○ |
| Scratch resistance, Depth of wound (μm) | 23 | 18 | 23 | 32 | 43 | 30 | 25 | 22 | 23 | 28 |

*Amount of 1,4-bond
**Amount of 1,2-vinyl bond
B: Butadiene
S: Styrene

TABLE 10

|  | Example | | | |
|---|---|---|---|---|
|  | 89 | 90 | 91 | 92 |
| (A) Degree of Hydrogenation (%) in butadiene part | | 98 | | |
| Amount of double bond remaining in main chain (%)* | | 1.5 | | |
| Amount of double bond remaining in side chain (%)** | | 0.5 | | |
| B/S ratio by weight # | | 100/0 | | |
| Monomer sequential structure | | — | | |
| Crystallization temp. (° C.) | | 25 | | |
| Heat quantity of crystallization at peak (J/g) | | 30 | | |
| Ratio of rubber particles having weight average particle size of 0.01-3 μm in total particles | 15 | 10 | 1 | 0 |
| Bleed resistance | ○ | ◎ | ◎ | ◎ |
| Feeling | ○ | ◎ | ◎ | ◎ |
| Abrasion resistance (number of reciprocations until embossed mark on surface disappears) | 240 | 360 | 450 | 480 |

*Amount of 1,4-bond
**Amount of 1,2-vinyl bond
B: Butadiene
S: Styrene

TABLE 11

| | | Example | | | | | | | |
|---|---|---|---|---|---|---|---|---|---|
| | | 93 | 94 | 95 | 96 | 97 | 98 | 99 | 100 |
| Polydimethylsiloxane | Addition amount to 100 parts by weight of (A) and (B) | 0 | | | | 1 | | | |
| | Kinematic viscosity (CS) | — | $10^2$ | $5 \times 10^3$ | $10^4$ | $5 \times 10^4$ | $10^5$ | $1.1 \times 10^5$ | $10^6$ |
| Abrasion resistance (number of reciprocations until embossed mark on surface disappears) | | 410 | 880 | 1900 | 3500 | 7600 | 9800 | 9800 | 9900 |
| Appearance | | ◎ | ◎ | ◎ | ◎ | ◎ | ◎ | ○ | O |

TABLE 12

| | | Example | | | | | | | | | | | | |
|---|---|---|---|---|---|---|---|---|---|---|---|---|---|
| | | 101 | 102 | 103 | 104 | 105 | 106 | 107 | 108 | 109 | 110 | 111 | 112 | 113 |
| (A) | Amount | | | | | | | 60 | | | | | | |
| | Degree of Hydrogenation (%) in butadiene part | 95 | 0 | 45 | 60 | 90 | 98 | 98 | 98 | 98 | 0 | 45 | 60 | 85 |
| | Amount of double bond remaining in main chain (%)* | 4.5 | 85 | 47 | 35 | 8 | 1.5 | 1.5 | 1.5 | 1.5 | 81 | 45 | 33 | 12 |
| | Amount of double bond remaining in side chain (%)** | 0.5 | 15 | 8 | 5 | 2 | 0.5 | 0.5 | 0.5 | 0.5 | 19 | 10 | 7 | 3 |
| | B/S ratio by weight # | 100/0 | | 70/30 | | | | | 90/10 | | 70/30 | | 80/20 | |
| | Monomer sequential structure | — | | | | random | | | | | | block | | |
| | Crystallization temp. (° C.) | 25 | | — | | | | | 10 | | — | | 25 | |
| | Heat quantity of crystallization at peak (J/g) | 20 | | — | | | | | 20 | | — | | 20 | |
| (B) Thermoplastic resin | Amount | | | | | | | 40 | | | | | | |
| | Type | | PS | | | | | SB | MS | PS/PPE 70/30 | | PS | | |
| Compatibilizer | Amount | 6 | | | | | | — | | | | | | |
| | Type | SEBS | | | | | | — | | | | | | |
| Oil resistance, Rate of weight change (%) | | 49 | 60 | 58 | 56 | 53 | 53 | 52 | 50 | 45 | 65 | 60 | 53 | 54 |
| Light stability, ΔE | | 4 | 40 | 17 | 10 | 5 | 4 | 1 | 1 | 6 | 45 | 19 | 10 | 8 |
| Heat stability, Weight retention (%) | | 97 | 38 | 55 | 80 | 90 | 98 | 98 | 98 | 98 | 35 | 42 | 85 | 88 |
| Tensile strength at break (MPa) | | 25 | 10 | 12 | 16 | 19 | 20 | 20 | 22 | 20 | 10 | 13 | 16 | 19 |
| Appearance of sheet | | ◎ | ○ | ○ | ○ | ◎ | ◎ | ◎ | ◎ | ◎ | ○ | ○ | ○ | ◎ |
| Scratch resistance, Depth of wound (μm) | | 10 | 30 | 23 | 20 | 14 | 9 | 10 | 7 | 9 | 35 | 25 | 18 | 15 |

*Amount of 1,4-bond
**Amount of 1,2-vinyl bond
B: Butadiene
S: Styrene

What is claimed is:

1. A thermoplastic crosslinked rubber composition consisting of (A) from 1 to 99 parts by weight of a random copolymer rubber consisting of a conjugated diene monomer unit and an aromatic vinyl monomer unit or a hydrogenated rubber thereof and (B) from 1 to 99 parts by weight of a thermoplastic resin consisting of a styrene-based thermoplastic resin, the total amount of (A) and (B) being 100 parts by weight, said (A) being partially or completely crosslinked, wherein said (A) is a non-crystalline rubber or a crystalline rubber.

2. The thermoplastic crosslinked rubber composition according to claim 1, wherein in the case of said (A) being a crystalline rubber, said (A) has a crystallization temperature in a range of from −50 to 70° C. and a heat quantity of crystallization at peak in a range of from 3 to 100 J/g in differential scanning calorimetry (DSC method).

3. The thermoplastic crosslinked rubber composition according to claim 1, wherein the hydrogenated rubber of (A) is a polymer obtained by hydrogenating not less than 50% of total double bonds of the homopolymer rubber or the copolymer rubber.

4. The thermoplastic crosslinked rubber composition according to claim 1, wherein a block of aromatic vinyl monomer may optionally be present in (A) in an amount of less than 10% by weight based on the total weight of aromatic vinyl monomers in component (A).

5. A thermoplastic crosslinked rubber composition consisting of (A) from 1 to 99 parts by weight of a random copolymer rubber consisting of a conjugated diene monomer unit and an aromatic vinyl monomer unit or a hydrogenated rubber thereof and (B) from 1 to 99 parts by weight of a thermoplastic resin consisting of a styrene-based thermoplastic resin, the total amount of (A) and (B) being 100 parts by weight, said (A) being partially or completely crosslinked, wherein said (A) is a non-crystalline rubber or a crystalline rubber, and wherein said (A) is present as particles with an average particle size of 0.01 to 3μm and a ratio of particle length dl/particle breadth d2 of 1 to 3.

* * * * *